Oct. 25, 1949.    J. C. CLAIBORNE    2,486,261
TOMATO PLANT RACK
Filed Sept. 4, 1946
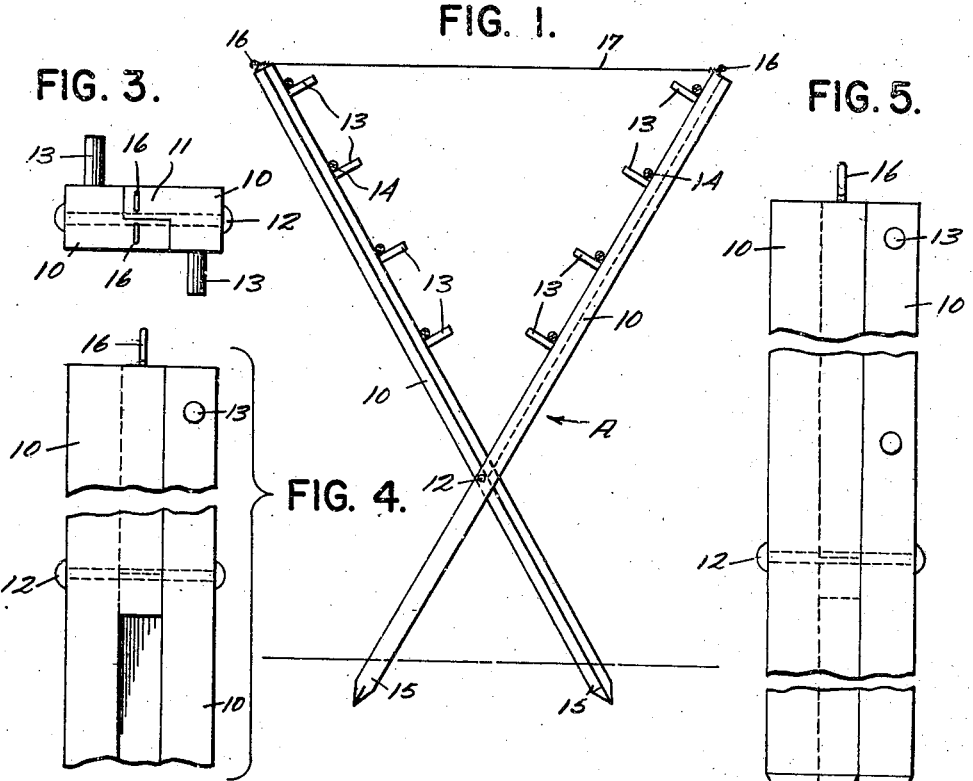
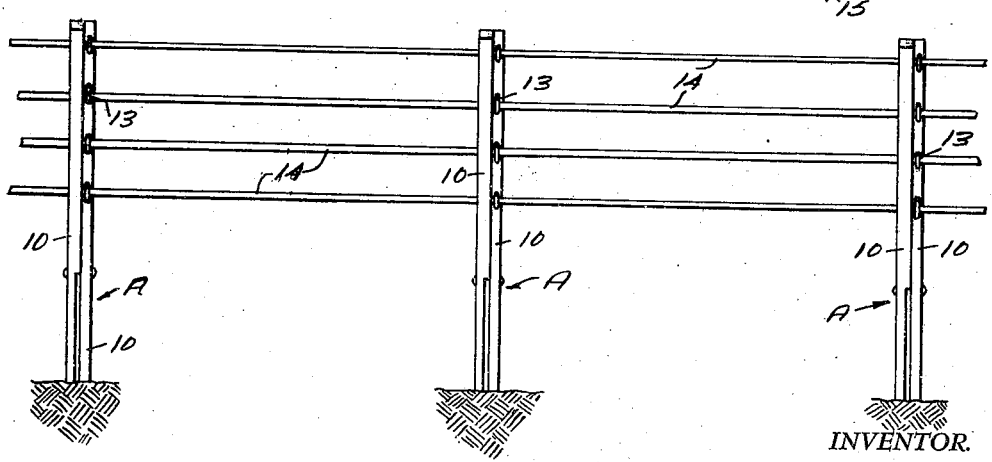
INVENTOR.
James C. Claiborne,
BY Victor J. Evans & Co.
ATTORNEYS Patented Oct. 25, 1949

2,486,261

UNITED STATES PATENT OFFICE 2,486,261

TOMATO PLANT RACK

James C. Claiborne, Arlington Heights, Va.

Application September 4, 1946, Serial No. 694,771

1 Claim. (Cl. 47—46)

The invention relates to a vine rack, and more especially to a tomato plant racking device.

The primary object of the invention is the provision of a device of this character, wherein growing vines, such as tomato plants can be readily and easily racked, so as to maintain such vines in an upright position and against falling onto the ground, which results in the latter instance in the rotting of produce and interferes with cultivation of the plants while growing.

Another object of the invention is the provision of a device of this character, wherein the same is of a foldable type to enable it to be stored in the least possible space while not in use, and also permits the transportation thereof from one point to another with ease, as well as the proper placement of the same to the plants, and after placement the latter will have full exposure to sunlight, while wind will have access for the drying of the plants or the blowing off of the water therefrom.

A further object of the invention is the provision of a device of this character, which is simple in construction, thoroughly reliable and efficient in operation, strong, durable, readily and easily folded and unfolded with dispatch, neat in appearance, avoids damage to the growing plants, and inexpensive to manufacture.

With these and other objects in view, the invention consists in the features of construction, combination and arrangement of parts as will be hereinafter set forth in detail, illustrated in the accompanying drawing, which shows the preferred embodiment of the invention, and pointed out in the claim hereunto appended.

In the accompanying drawing:

Figure 1 is an end elevation of the rack assembly constructed in accordance with the invention;

Figure 2 is a side view thereof;

Figure 3 is a top plan view of one of the leg frames folded;

Figure 4 is a fragmentary side view thereof;

Figure 5 is an elevation of one of the leg members.

Similar reference character indicate corresponding parts throughout the several views in the drawing.

Referring to the drawing in detail, the device constituting the present invention comprises a plurality of foldable leg frames denoted generally at A, and involves a pair of straight stakes, leg pieces or members 10, preferably for a major portion of their length, of angle or L-shape formation in cross-section, as at 11. These pieces or members 10 of each frame A are connected together by a pivot 12 for scissor-like action in the folding and unfolding of such frame, the latter being shown unfolded in Figure 1 of the drawing for service.

The leg pieces or members 10 of each frame A above the pivot 12 have projecting outwardly from each confronting spaced racking pegs or pins 13 for removably carrying runners rails 14 adapted to be horizontally held in position for supporting growing vines or plants, such as tomato plants, not shown, to hold the same from off of the ground, and thereby prevent earth rot to produce therefrom. The assembly of the frames A when in service with the runner rails 14 is best seen in Figure 2 of the drawing.

The lowermost ends of the pieces or members 10 are provided with pointed anchoring tips 15 for anchorage in the ground, as will be apparent from the drawing.

At the upper ends of the pieces or members 10 of the frame A are mounted eyes 16 to which is tied a bracing wire 17 to limit the extent of unfolding of these pieces when setting up the racking assembly in the racking of the vines or plants. The assembly can be of any selected length according to the extent of run of the plants in a row of growth thereof.

The device is readily foldable and unfoldable, and will conveniently stake the plants for the growing thereof, and holding the same from the ground or earth.

What is claimed is:

In a collapsible tomato plant rack, the combination, which comprises, a plurality of frames each including a pair of interlocking stakes with pointed lower ends, each stake being L-shaped in cross section and positioned with two of the legs thereof overlapping and the other legs forming parallel base members perpendicular to the overlapping legs, means pivotally connecting the stakes at points spaced from the lower ends thereof, rack supporting pins projecting from the inner surfaces of the stakes with the stakes open to the set up position, eyes projecting from the upper ends of the stakes, wires connecting the eyes of the stakes of the frames respectively maintaining the racks in set up positions, and plant supporting rails positioned on said rack supporting pins.

JAMES C. CLAIBORNE.

REFERENCES CITED

The following references are of record in the file of this patent:

UNITED STATES PATENTS

| Number | Name | Date |
| --- | --- | --- |
| 129,385 | Winship | July 16, 1872 |
| 319,674 | Claus | June 9, 1885 |
| 680,507 | Thomas | Aug. 13, 1901 |
| 841,058 | Sherlock | Jan. 8, 1907 |
| 941,894 | Stetson | Nov. 30, 1909 |